March 14, 1967  E. J. VORWALD  3,308,730
INTERCHANGEABLE ROCK AND FROST BREAKER AND TAMPER
Filed Aug. 7, 1964  3 Sheets-Sheet 3
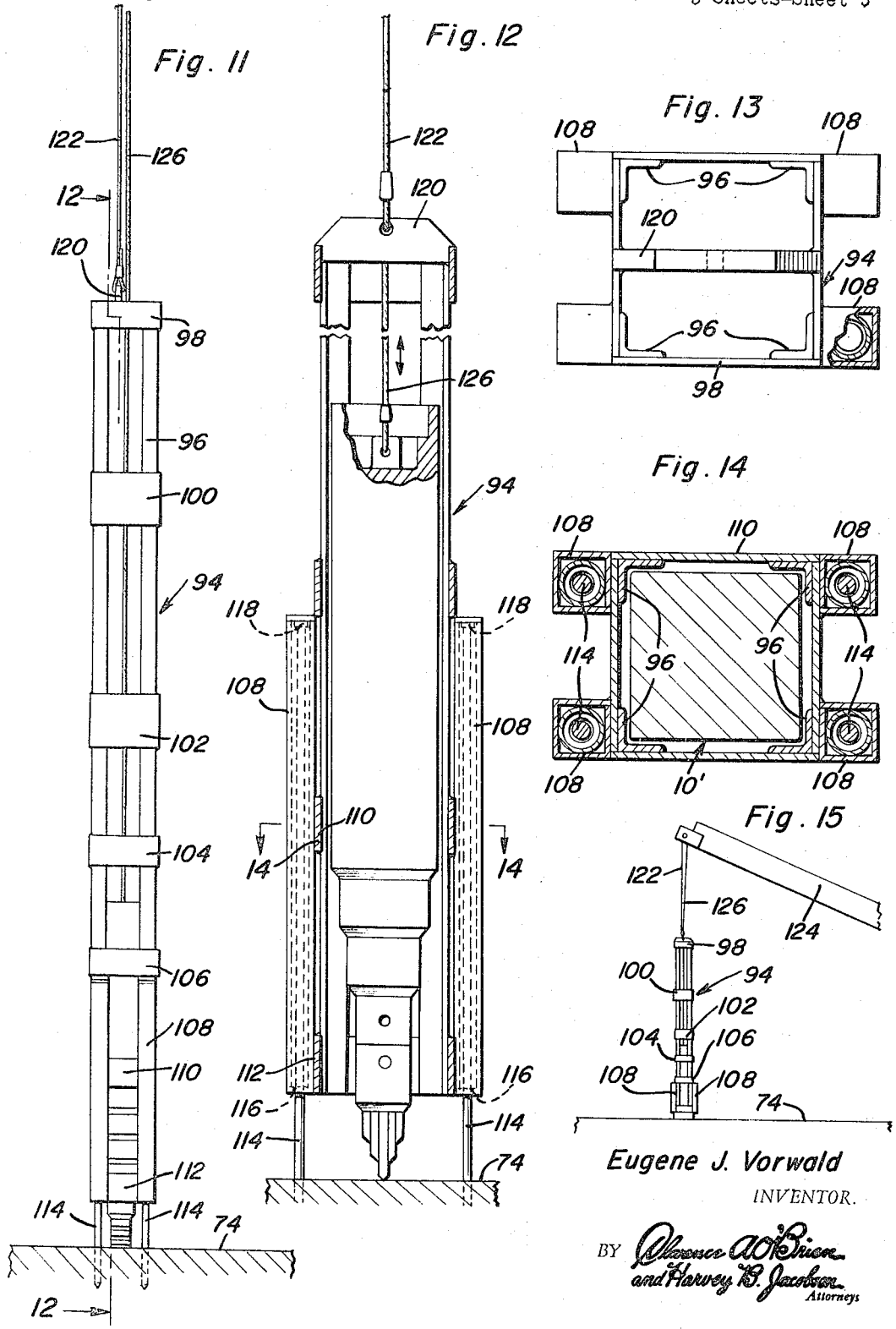
Eugene J. Vorwald
INVENTOR.

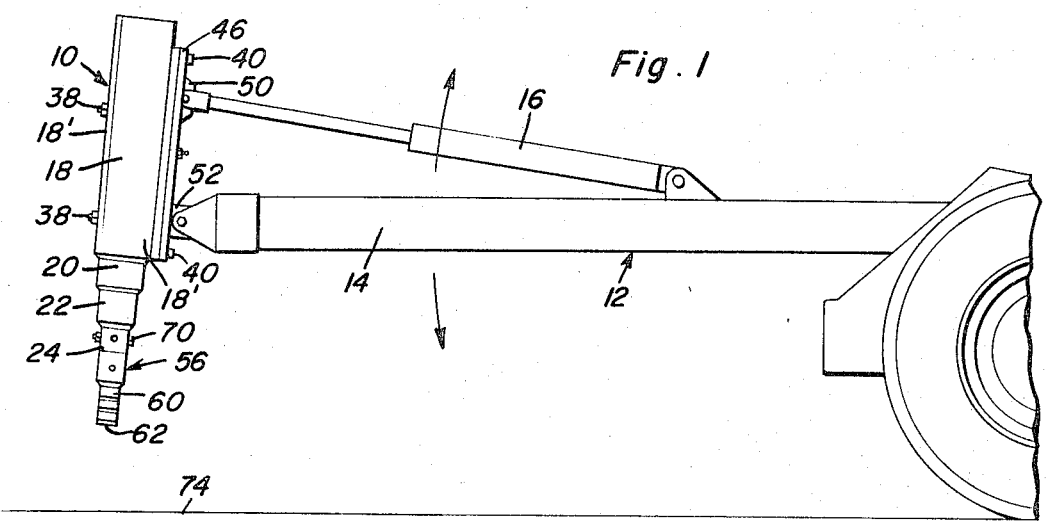
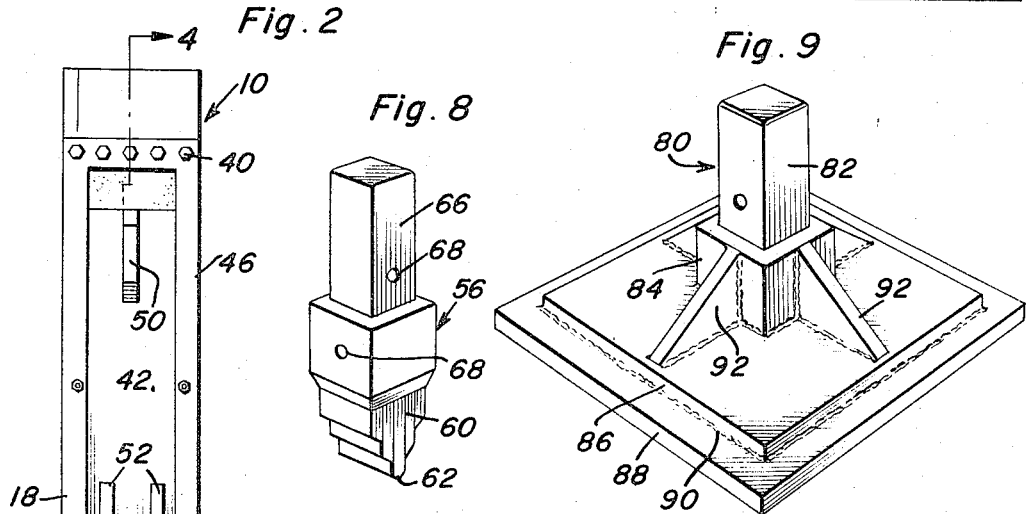
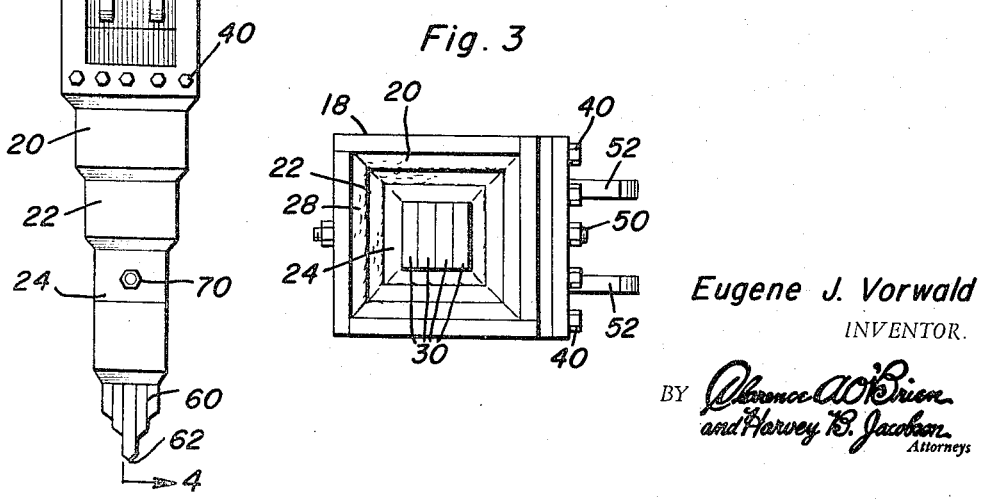

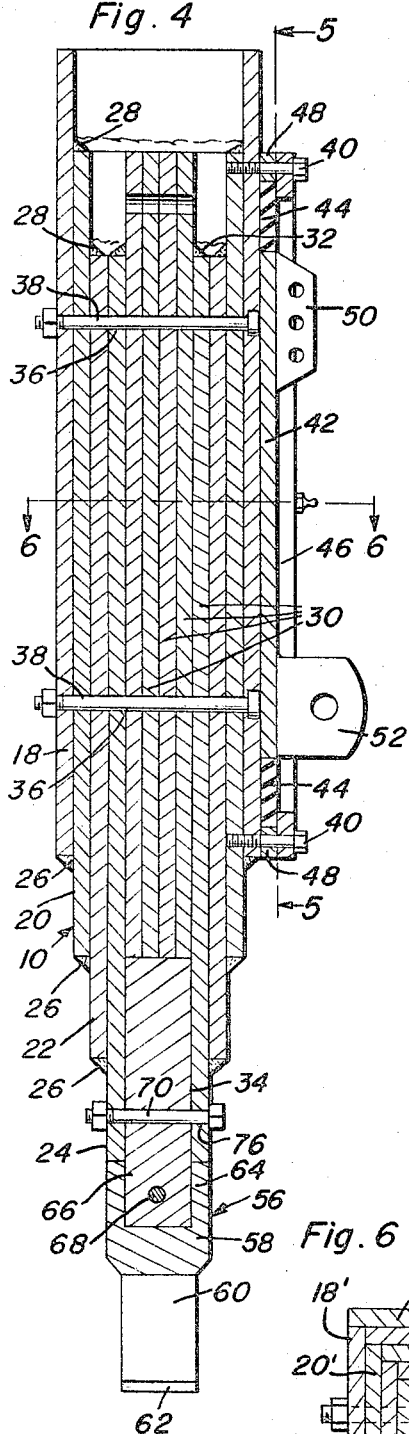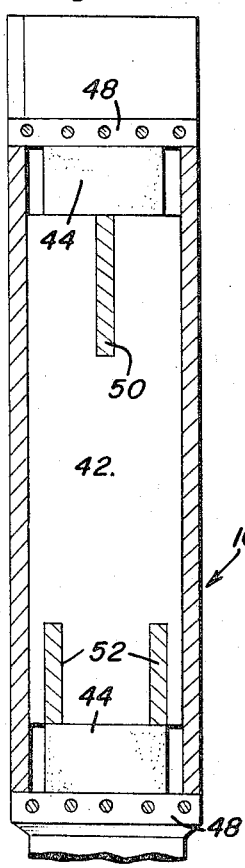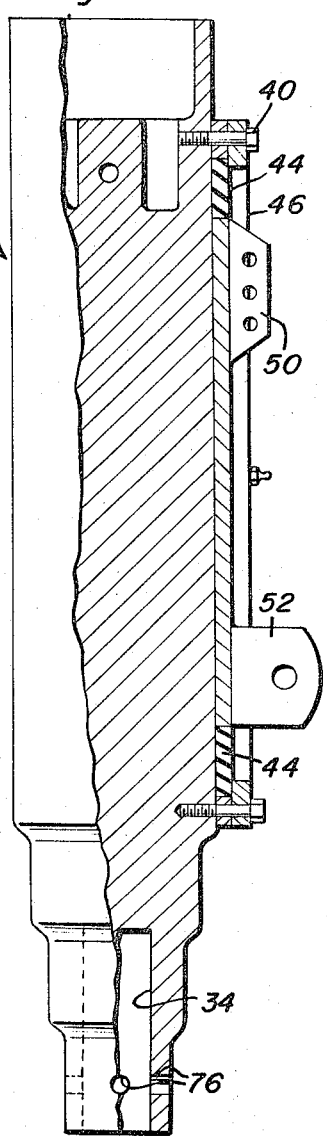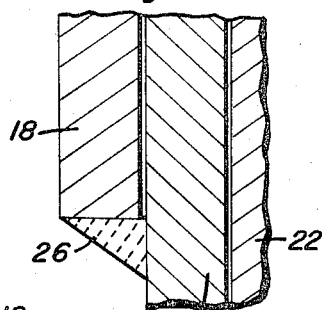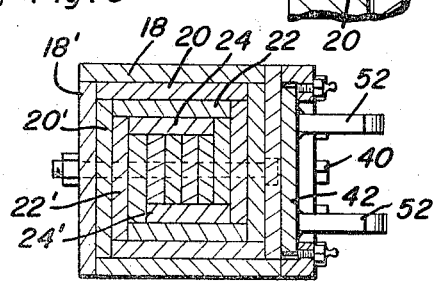
Eugene J. Vorwald
INVENTOR

United States Patent Office 3,308,730
Patented Mar. 14, 1967

3,308,730
INTERCHANGEABLE ROCK AND FROST
BREAKER AND TAMPER
Eugene J. Vorwald, R.F.D., Holy Cross, Iowa 52053
Filed Aug. 7, 1964, Ser. No. 388,079
7 Claims. (Cl. 94—49)

This invention relates to a novel and useful ground working machine and more specifically to a drop hammer-type apparatus including an impact member adapted to impact with the ground and including interchangeable heads, one for tamping the ground and the other for penetrating the ground whether the ground be frozen or rocky. In addition, the earth working machine or assembly of the instant invention includes an impact member which is adapted, by means of a suitable attachment therefor to be readily removably secured to a back hoe boom or the like whereupon the back hoe boom may be utilized to raise and drop the impact member into engagement with the ground. Still further, the impact member, without the aforementioned attachment, is designed to be slidably received within a tubular guide member provided therefor whereupon the tubular guide member may be disposed in an upstanding position with its lower end engaging the ground and the impact member may be raised by means of a crane cable or the like and allowed to drop downwardly through the tubular guide member into engagement with the ground. Finally, the earth working assembly of the instant invention includes means, interconnected between the impact member and the attachment therefor adapting the impact member to be mounted on a back hoe boom, including resilient deformable means disposed between opposing surfaces of the attachment and the impact member and adapted, upon rapid downward movement of the attachment and therefore movement of the impact member into engagement with the ground, to absorb the force of impact of the impact member with the ground, the impact member being supported from the associated boom by means of the attachment for vertical reciprocation between upper and lower limit positions relative thereto.

The main object of this invention is to provide an earth working assembly including an impact member of the drop hammer-type that may be readily supported from and operated by means of a back hoe boom and yet still be additionally readily adapted for use as a free falling drop hammer impact member in combination with an upstanding guide operatively associated therewith and from which the impact member is supported for vertical reciprocation.

Another object of this invention, in accordance with the immediately preceding object, is to provide an impact member including means carried by its lower end adapted to removably support a selected earth engaging member of a plurality of various types of earth engaging members.

Yet another object of this invention is to provide a vertically disposed tubular guide member for the impact member of the instant invention including a plurality of depending earth engaging feet disposed about its lower end portion and vertically shiftable relative to the lower end of the tubular guide whereby the depending feet will be adapted to engage uneven ground so as to prevent the lower end portion of the tubular guide from being laterally shifted relative to the ground.

Still another object of this invention is to provide an impact member, in accordance with the immediately preceding object including means carried by its upper end portion adapted to be removably secured to a lifting member such as a boom cable and a tubular guide including means carried by its end adapted to be removably supported from a second lifting cable such as that which might be supported from a crane boom.

A still further object of this invention is to provide an impact member constructed in a manner whereby it will be extremely durable and also adapted for ready replacement.

A final object of this invention to be specifically enumerated herein is to provide an earth working assembly in accordance with the preceding objects which will conform to conventional forms of manufacture, be of simple construction and easy to use so as to provide a device that will be economically feasible, long lasting and relatively troublefree in operation.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a side elevational view of the impact member of the instant invention shown operatively supported from the boom of a conventional back hoe-type vehicle;

FIGURE 2 is an enlarged side elevational view of the impact member as seen from the right side thereof in FIGURE 1;

FIGURE 3 is a top plan view of the impact member illustrated in FIGURE 2;

FIGURE 4 is a vertical sectional view taken substantially upon the plane indicated by the section line 4—4 of FIGURE 2;

FIGURE 5 is a fragmentary vertical sectional view taken substantially upon the plane indicated by the section line 5—5 of FIGURE 4;

FIGURE 6 is a horizontal sectional view taken substantially upon the plane indicated by the section line 6—6 of FIGURE 4;

FIGURE 7 is an enlarged fragmentary vertical sectional view illustrating an enlarged portion of the lower end of the impact member illustrated in FIGURE 4 and clearly illustrating the manner in which the various telescoped tubular members of the impact member are secured together by welding;

FIGURE 8 is a perspective view of the earth engaging head carried by the lower end portion of the impact member;

FIGURE 9 is a perspective view of a modified form of earth engaging head which may be carried by the lower end of the impact member in lieu of the earth engaging head illustrated in FIGURE 8;

FIGURE 10 is a vertical sectional view similar to that of FIGURE 4 but illustrating the modified form of impact member of solid onepiece construction, portions being shown in side elevation;

FIGURE 11 is a side elevational view of an elongated guide member adapted to be utilized in conjunction with either impact member of the instant invention and for the purpose of supporting the impact member for vertical reciprocation;

FIGURE 12 is a fragmentary enlarged sectional view taken substantially upon the plane indicated by the section line 12—12 of FIGURE 11;

FIGURE 13 is a top plan view of the tubular guide illustrated in FIGURES 11 and 12 and shown on somewhat of an enlarged scale;

FIGURE 14 is an enlarged horizontal sectional view taken substantially upon the plane indicated by the section line 14—14 of FIGURE 12; and FIGURE 15 is a side elevational view of the assembly illustrated in FIGURE 11 but on somewhat of a reduced scale and illustrating the manner in which the tubular guide member may be supported by a boom cable in a stationary position and the reciprocal impact member may be raised and lowered within the tubular guide member by means of a second boom cable.

Referring now more specifically to the drawings the numeral 10 generally designates the impact member of the instant invention which may be seen illustrated in FIGURE 1 as being supported from the free end of a backhoe boom assembly generally referred to by the reference numeral 12.

The boom assembly 12 includes a vertically swingable main boom 14 and an extendable auxiliary boom 16 defined by the double acting fluid motor.

The impact member 10 includes four tightly telescoped elongated tubular sections 18, 20, 22 and 24. The tubular members 18, 20, 22 and 24 are formed by four rigidly interconnected sides 18′, 20′, 22′ and 24′. Each of the tubular sections or members 18, 20, 22 and 24 is substantially rectangular in cross-section and the corresponding sides of each tubular section or member are rigidly secured together by means of welding (not shown) at their adjacent edge portions. Although the tubular members 18, 20, 22 and 24 are tightly telescoped, the corresponding sides of immediately adjacent tubular members are slightly spaced from each other. In addition, from FIGURE 4 of the drawings it will be noted that the lower ends of the tubular members are not horizontally aligned and that the lower end of each tubular member is fixedly secured to the immediately adjacent inner tubular member by means of welding 26. In addition, it may be seen that the tubular members 18, 20 and 22 are also secured together adjacent their upper ends by means of welding 28.

The innermost tubular member 24 is filled by means of a plurality of filler plates which are also spaced slightly apart and which are secured together in any convenient manner such as by welding. These filler plates are referred to by the reference numerals 30 and the center filler unit defined thereby is also secured within the innermost tubular member 24 by means of welding 32. The lower ends of the filler plates 30 terminate a spaced distance above the lower end of the innermost tubular member 24 thereby defining a downwardly opening blind bore 34 in the lower end of the inner tubular member 24. Still further, a plurality of bores 36 are formed through the impact member 10 and have bolts 38 secured therethrough which also serve to secure the tubular members 18, 20, 22 and 24 and the filler plates or members 30 together.

Secured to one side of the impact member 10 by means of suitable bolt-type fasteners 40 is a mounting or guide member 46 defining an upstanding guideway. A mounting plate or follower member 42 is reciprocal in the guideway 46 and a pair of resilient and deformable slabs 44 are held captive within the opposite ends of the guideway. The resilient and deformable slabs 44 are interposed between the upper and lower ends of the plate 42 and the filler plates 48 defining the upper and lower limits of the mounting member 46. The slabs 44, by means of their resiliency, support the plate 42 in an intermediate or center rest position and yieldingly resist movement of the plate 42 relative to the impact member 10. The plate 42 is provided with apertured mounting lugs 50 and 52 mounted thereon which project outwardly thereof and which are pivotally secured to the free ends of the extendable fluid motor 16 and the main backhoe boom 14.

A ground engaging head generally referred to by the reference numeral 56 is provided and includes an upwardly opening socket portion 58 and a downwardly projecting and laminated impact blade 60 whose lower end is pointed as at 62. The socket portion 58 defines an upwardly opening bore 64 in which the lower end of a shank portion 66 is removably secured by means of a transverse pin 68 secured through the shank portion 66 and the socket portion 58. The upper end of the portion 66 is removably secured within the bore 34 by means of a removable retaining pin 70 secured through the lower terminal end portion of the inner tubular member 24 and the shank portion 66. From FIGURE 4 of the drawings it may be seen that the upper end portion of the shank portion 66 is snugly and seatingly received within the bore 34 and that the lower end portion of the shank portion 66 is also seatingly received within the bore 64. Still further, the lower face of the innermost tubular member 24 is disposed in surface-to-surface contacting relation with the upper surface of the socket portion 58. In operation, the backhoe main boom 14 may be raised and lowered so as to bring the sharpened lower end 62 of the impact member 10 into engagement with the ground 74. Inasmuch as the bores 34 and 64 are square in horizontal cross-section and the shank portion 66 is also square in horizontal cross-section, the impact head 56 may be readily rotated 90 degrees relative to the lower end of the innermost tubular member 24 which is provided with a pair of right angularly disposed bores 76 through which the fastener 70 may be secured.

The spacing between corresponding adjacent plates or sides 18′, 20′, 22′ and 24′ as well as the filler plates 30 enable these plates to buckle slightly relative to each other as the sharpened lower terminal end portion of the impact member 10 engages the ground 74. Accordingly, the slabs 44 and the spacing between the adjacent plates of the impact member 10 serve to provide a means whereby the severe stresses caused by the impact of the impact member with the ground 74 may be lessened. The slabs 44 greatly reduce the transmission of the impact of the impact member 10 with the ground 74 to the main boom 14.

With attention now invited to FIGURE 9 of the drawings there will be seen a further modified form of impact head generally referred to by the reference numeral 80 and which includes a shank portion 82 similar to the shank portion 66 and securable in the bore 34. The impact head 56 includes a socket member 84 in which the lower end of the shank portion 82 is fixedly secured and a pair of vertically stacked horizontal plates 86 and 88 which are welded together as at 90 are secured to the socket portion 84 by means of gussets 92. The lowermost plate 88, when the impact head 80 is secured within the lower end of the tubular member 24, may be utilized to tamp the ground 74.

With attention now directed to FIGURES 11–15 of the drawings there may be seen a guide attachment for the impact member 10 which is generally referred to by the reference numeral 94 and which includes a plurality of upstanding angle corner members 96 rigidly interconnected by means of a plurality of sleeve assemblies 98, 100, 102, 104 and 106. The sleeve assemblies are rigidly secured to the angle corner members 96 in any convenient manner such as by welding (not shown) and a plurality of tubular guides 108 are secured to the lower end portions of the angle corner members 96 by means of further sleeve assemblies 110 and 112 which are also secured to the angle corner members 96. The tubular guides 108 have elongated foot members 114 reciprocal therein and which project through small openings 116 formed in the lower ends of the tubular guides 108. The upper ends of the foot members include head portions 118 which prevent the foot members 114 from being completely withdrawn downwardly through the openings 116. The foot members 114 project below the lower end of the impact member 10 when it is engaged with the ground 74 as the lower ends of the foot members 114 are deeply embedded in the ground 74 upon initial placement of the guide attachment 94.

The upper sleeve assembly 98 includes an apertured lifting flange 120 to which a lifting cable 122 supported from a crane boom 124 may be secured. In initially placing the guide attachment 94, either the boom assembly 124 may be rapidly lowered toward the ground 74 in order to force the lower ends of the foot members 114 to become embedded with the ground 74 or the boom cable 122 may be suddenly played out so as to also cause the guide assembly 94 to be dropped into engagement with the ground 74. Then, the second boom cable 126 which may be secured to the upper end of the impact member 10 or the modified form of impact member 10′ illustrated in FIGURES 10, 11, 12 and 14, may be alternately played out and reeled in so as to drop the impact member 10′ into engagement with the ground 74 and to thereafter lift the impact member 10′ above the ground for readiness to again be dropped into engagement with the ground 74.

The impact member 10′ is substantially the same as the impact member 10 except that the impact member 10′ is of one piece solid construction. In some instances where it is not necessary to use a laminated impact member such as the impact member 10, a less expensive solid one piece impact member similar to the impact member 10′ may be utilized. Otherwise, the structural features of the impact members 10 and 10′ are identical.

The attachment comprising the guideway or guide 46 and the plate 42 as well as the slabs 44 will of course, however, be removed from engagement with the impact member 10 should it be desirable to use the latter in combination with the guide attachment 94. In removing the attachment from the guide member 10, it is merely necessary to remove the bolts or fasteners 40 whereupon the outside dimensions of the impact member 10 will be substantially identical to the outside dimensions of the impact member 10′. Additionally, the attachment may be also secured to the impact member 10′ as shown in FIGURE 10 in order that it may also be secured to the back hoe boom assembly 12.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A ground and rock impact bit assembly comprising an elongated vertically disposed impact member including means at its lowermost end adapted to impact with hard ground and rock formations, a pair of mounting members carried by said impact member including means adapted for quick releasable securement to a lifting member, one of said members defining a guide member and the other of said members defining a follower member engaged with the guide member for guided limited longitudinal reciprocal movement of said impact member relative to said mounting member, said guide member including a pair of opposing abutment surfaces between which said follower member is disposed and reciprocal, and resilient deformable members disposed between said opposing surfaces and said follower member for cushioning the impact of the lower end of said impact member with the ground upon rapid lowering of said mounting means.

2. The combination of claim 1 wherein the lower end portion of said impact member has a downwardly opening blind bore formed therein, said means at the lowermost end of said impact member including an impact head including an upwardly projecting shank portion snugly and seatingly removably secured in said bore.

3. The combination of claim 2 wherein said impact head includes an upper surface which is disposed in abutting relation with the undersurface of said impact member disposed about said bore, said impact head having an upwardly opening blind bore formed therein in which the lower end of said shank portion is snugly and seatingly removably secured.

4. The combination of claim 3 wherein said bores are non-circular in cross-section and the upper and lower ends of said shank portion are complementary in cross-section and are snugly and seatingly releasable in said bores in adjusted rotated positions relative thereto.

5. A ground and rock impact bit assembly comprising an elongated vertically disposed impact member including means at its lowermost end adapted to impact with hard ground and rock formations, a mounting member including means adapted for quick releasable securement to a lifting member, means supporting said impact member from said mounting member, said impact member comprising a plurality of vertically disposed elongated laminated plate-like members constructed of rigid material and secured together in slightly laterally spaced apart relation as an integral unit.

6. The combination of claim 5 wherein said plate-like members define a plurality of tightly telescoped tubular members of rectangular cross-section.

7. The combination of claim 6 wherein the innermost tubular member is filled by a plurality of side by side filler plates rigidly secured together and within the innermost tubular member.

References Cited by the Examiner
UNITED STATES PATENTS

| | | | |
|---|---|---|---|
| 1,792,894 | 2/1931 | Collins | 173—162 |
| 2,201,047 | 5/1940 | Moore | 52—730 |
| 2,230,628 | 2/1941 | Sahlberg | 52—730 |
| 2,287,081 | 6/1942 | Attwell | 52—730 X |
| 2,304,845 | 12/1942 | Pegno | 299—37 |
| 2,633,781 | 4/1953 | Day | 94—48 |
| 2,951,427 | 9/1960 | Moir | 94—48 |
| 3,067,657 | 12/1962 | Wiekhorst | 94—49 |
| 3,091,159 | 5/1963 | Miller | 94—49 |
| 3,238,690 | 3/1966 | Wilkins | 52—731 X |

JACOB L. NACKENOFF, *Primary Examiner.*